(12) United States Patent
Zähner

(10) Patent No.: US 6,182,517 B1
(45) Date of Patent: Feb. 6, 2001

(54) BURETTE TIP

(75) Inventor: Paul Zähner, Herisau (CH)

(73) Assignee: Metrohm AG, Oberdorfstrasse (CH)

( * ) Notice: Under 35 U.S.C. 154(b), the term of this patent shall be extended for 0 days.

(21) Appl. No.: 09/141,016

(22) Filed: Aug. 27, 1998

(30) Foreign Application Priority Data

Sep. 18, 1997 (EP) ................................................ 97810682

(51) Int. Cl.⁷ .................................. B01L 3/02; B01L 3/00
(52) U.S. Cl. ........................... 73/864.01; 73/863; 73/864; 73/864.02; 73/864.51; 422/180
(58) Field of Search ........................... 73/864.02, 864.65, 73/864.66

(56) References Cited

U.S. PATENT DOCUMENTS

| | | | |
|---|---|---|---|
| 2,388,548 | * 11/1945 | Jurs, Jr. ............................ | 73/864.65 |
| 2,818,969 | * 12/1958 | Porter ............................... | 73/864.66 |
| 3,285,296 | * 11/1966 | Ishimaru et al. .................. | 73/864.02 |
| 4,307,731 | 12/1981 | Kaufman .......................... | 600/579 |
| 4,308,028 | * 12/1981 | Elkins ............................... | 73/864.02 |
| 4,461,328 | * 7/1984 | Kenney ............................ | 73/864.02 |
| 4,683,916 | 8/1987 | Raines ............................. | 137/854 |
| 4,729,401 | 3/1988 | Raines ............................. | 137/512 |
| 4,812,293 | * 3/1989 | McLaurin et al. ................ | 73/864.02 |
| 5,325,889 | 7/1994 | Paul et al. ........................ | 137/594 |

FOREIGN PATENT DOCUMENTS 0 250 243 A2   12/1987 (EP) .

OTHER PUBLICATIONS

International Search Report.

* cited by examiner

Primary Examiner—Daniel S. Larkin
Assistant Examiner—Dennis Loo
(74) Attorney, Agent, or Firm—Shoemaker and Mattare Ltd.

(57) ABSTRACT

A burette tip (1) for metering a titrating agent consists essentially of a burette body (10) with a seat (3) for a membrane and with such a membrane (2). The burette tip (1) comprises, for protecting the membrane (2) and the seat (3) against mechanical damage, a covering (4, 5, 15) which at least partly encloses and covers the membrane (2) and the seat (3). The membrane (2) is clamped between the burette body (10) and a cover part (5) and is held in the burette body (10).

9 Claims, 2 Drawing Sheets

BURETTE TIP

Figure 1:
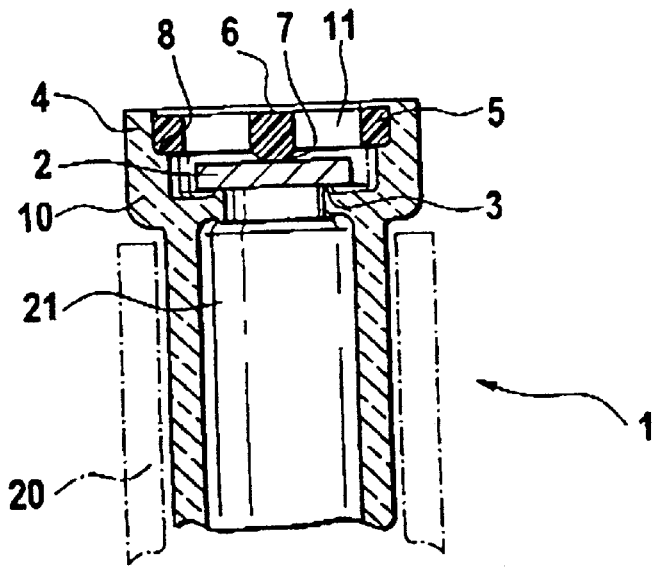

The invention relates to a burette tip for titrating a fluid and the use of a burette tip. Such burette tips are used when titrating for metering a titrating agent.

When titrating, a titrating agent is added to a sample fluid until a certain effect is observed. From the consumption of the titrating agent the content of a component of the sample fluid responsible for this effect can be determined. The measuring accuracy thus depends considerably on the accuracy with which the consumption of the titrating agent is evaluated or with which the titrating agent may be metered.

Often the titration is carried out with a burette tip submersed into the sample fluid. If the titrating agent is specifically heavier than the sample fluid when the titrating agent and the sample fluid have differing concentrations, or the titrating agent and the sample fluid on their bordering surface have differing speeds, the sample fluid may enter into the burette tip and the titrating agent may exit into the sample fluid. This may lead to inaccuracies in measurement.

It is known (for example with the Metrohm titroprocessor 636) to apply a microvalve acting in the manner of a one-way valve, which is closed with a membrane which although letting titrating agent exit does not let any sample fluid enter (microvalve for diffusion-preventing burette tips from Metrohm, product number 6.2726.060). From CH 660 131 it is also known to provide burette tips with a siphon which is to prevent the diffusion. Burette tips with a siphon do not prevent the diffusion of titrating agent and sample fluid of differing concentrations. Also diffusion by way of differing speeds at the border surface is not prevented. Furthermore the manufacture of the above mentioned microvalve is complicated since the membrane must be placed onto the front part of the microvalve with a great precision. A further disadvantage of known microvalves may lie in the fact that the membrane and the valve seat are accessible from the outside, which with an incorrect handling leads to an increased susceptibility of the microvalve to mechanical damage. A disadvantage of known microvalves of hard materials may also lie in the fact that the membrane must be opened with a relatively large pressure of the titrating agent. The smallest damage on the valve seat and/or on the membrane may however already lead to the undesirable entering of sample fluid or the outflow of the titrating agent.

It is the object of the present invention to avoid the disadvantages of the known devices, thus in particular to provide a burette tip for titrating a fluid which is less susceptible to mechanical damage and which can be manufactured in a simple and economical manner.

According to the invention these objects are achieved with a burette tip with the features described below.

The burette tip comprises a membrane (mostly of a soft plastic) and a (in any case comparatively) hard seat for this membrane. For protecting the membrane and/or the seat from mechanical damage the burette tip according to the invention comprises a covering. The covering covers the membrane and the seat for the membrane at least partly.

Advantageously the covering consists of a circumferential annular wall which encloses the membrane and the seat and where appropriate of a cover part which partly covers the surface of the membrane. The membrane should not be completely covered by the cover part so that fluid may still exit.

A particularly simple embodiment example results when the membrane is pressed simultaneously with the cover part against the seat. For this the cover part may be provided with a projection arranged in a central region.

The burette tip can be particularly simply manufactured when the cover part can be latched on the annular wall. The annular wall may for example be provided with a deepening with a resting surface for receiving the cover part. Advantageously the annular wall projects slightly beyond the cover part applied into the deepening.

In a preferred embodiment part the burette tip consists exclusively of the cover part, a burette body comprising the seat and the membrane. The membrane is held between the cover part and the burette body. The burette body and the cover part are advantageously integrally formed as plastic injection moulding parts. Such a burette tip may be particularly simply manufactured. The burette body and the cover part are injection moulded. The membrane is applied into the burette body onto the seat and the cover part is latched into the deepening of the annular wall of the burette body. The cover part simultaneously presses the membrane against the seat of the membrane.

The cover part is advantageously formed as an circular ring which is provided with webs running through the centre of the circle. The projection for pressing the membrane against the seat may be mounted in the center of the circular ring.

Alternatively it is also conceivable to form the cover part as a circular disk provided with openings.

In an alternative embodiment example it is also conceivable to form the burette body without a circumferential annular wall and to form the covering as a curved cover cap which covers and encloses the membrane and the valve seat simultaneously.

Figure 2:
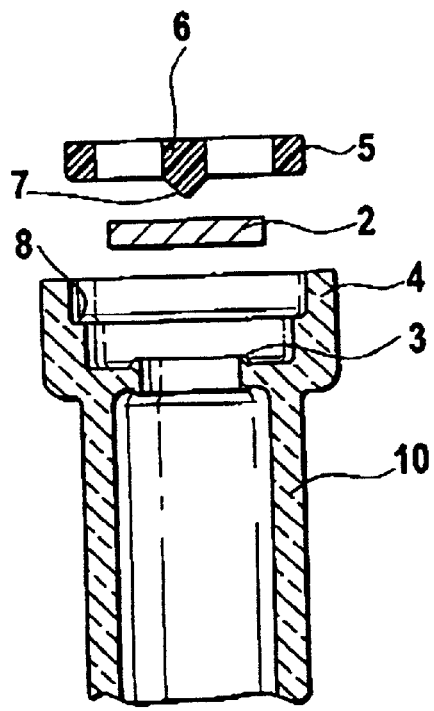
Figure 3:
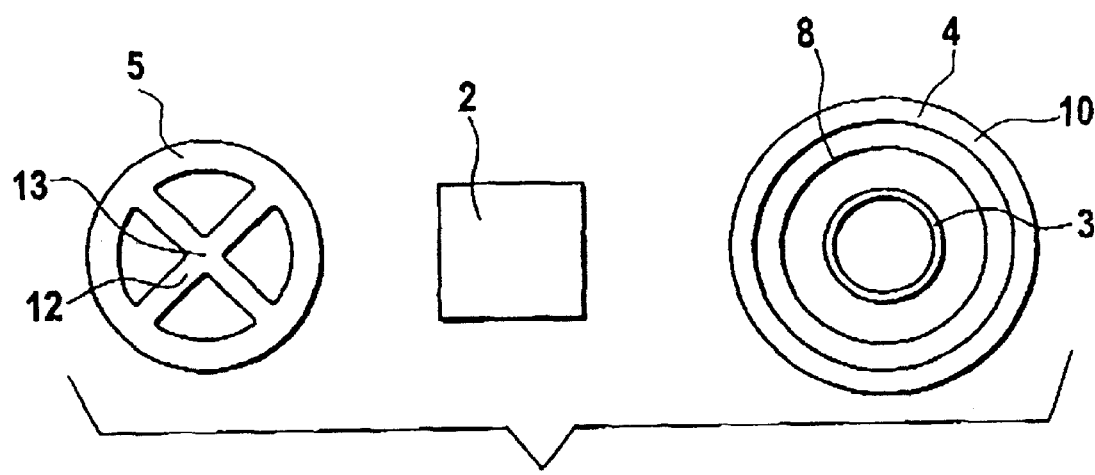
Figure 4:
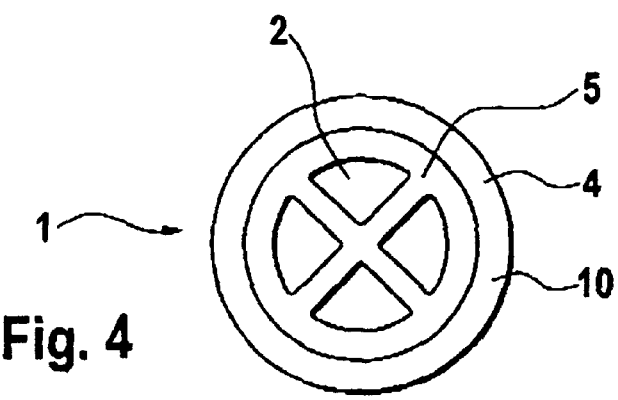
Figure 5:
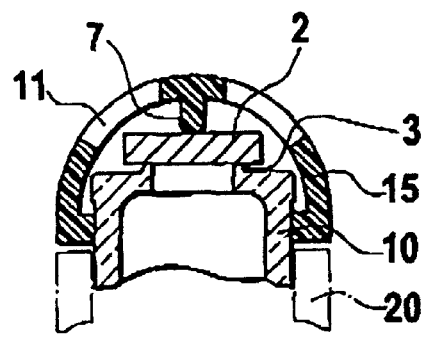

The invention is hereinafter described in more detail by way of the drawings. There are shown:

FIG. 1 a cross section through a burette tip according to the invention,

FIG. 2 an exploded drawing of the burette according to the invention, in cross section, FIG. 3 a plan view of the individual components of the burette tip according to the invention, FIG. 4 a plan view of an assembled burette tip, FIG. 5 a schematic representation of an alternative embodiment example of a burette tip in cross section.

The burette tip 1 shown in FIG. 1 consists of a microvalve a burette body 10, a membrane 2 and with a cover part 5. The burette tip 1 may be connected to a metering device for a titrating agent with a tubing 20 represented dashed.

The burette body 10 comprises an opening 21 for the through-flow of a titrating agent. The burette body 10 is pressed against the seat 3 with a certain pretensioning. The opening 21 by way of this is closed by the membrane 2 and is only opened as soon as the pressure of the titrating agent in the opening 21 exceeds a predeterminable value. The entering of sample fluid from outside the burette tip 1 into the inside is prevented by way of this.

The membrane 2 is pressed with the cover part 5 against the seat 3. The cover part 5 comprises in a central region 6 a projection 7 which is directed against the membrane 2 and presses onto this. The cover part protects the membrane 2 and the seat 3 from mechanical damage.

The burette body 10 is furthermore provided with a circumferential annular wall 4 which encloses the seat 3 and the membrane 2. The annular wall 4 comprises a recess 8 with a resting surface 9 on which the cover part 5 may be supported. The cover part 5 is latched into the recess 8. The annular wall projects slightly beyond the cover part 5.

Also the annular wall 4 protects the membrane 2 and the seat 3 from damage.

As soon as the titrating agent in the opening 21 has reached a certain pressure, the membrane 2 slightly lifts and releases an opening for the titrating agent between the seat 3 and the membrane 2. The cover part 5 is provided with openings 11 which permit the exit of titrating agent.

FIG. 2 shows an exploded drawing of the burette tip shown in FIG. 1. The burette body 10 and the cover part 5 may be manufactured as an injection moulded part. For manufacturing the burette tip 1 the membrane 2 is applied into the burette body 10 and laid onto the seat 3. The membrane 2 is fixed on the seat 3 with the cover part 5 and covered.

In FIG. 3 a plan view of the three components of the burette tip 1 of FIG. 2 is shown. The burette body 10 and the cover part 5 are formed rounded whilst the membrane 2 is formed square. The square formation of the membrane permits a particularly simple application and centering of the mebrane on the seat or within the annular wall 4 of the valve body 10.

In the right part of FIG. 3 the burette body 10 provided with a deepening 8 is to be seen. The cover part 5 shown on the left side of FIG. 3 is applied within the annular wall 4 of the burette body 10 and rests on the resting surface 9 of the recess 8. The cover part 5 is formed as a circular ring which is provided with webs 12 running through the centre 13 of the circular ring. The webs carry the projection 7 (not visible in FIG. 3) for pressing the membrane.

FIG. 4 shows a plan view of the assembled microswitch 1. The membrane 2 is partly covered by the cover part 5 and is enclosed by the annular wall 4.

The burette tip 1 may be manufactured in a highly precise manner with injection moulding technology. As a material for the cover part and the burette body typically, ETFE (Tetzel) is used. The membrane for example consists of FFPM (Kalrez). With the burette tip according to the invention flow rates between 0.001 ml and 170 ml per minute can be achieved. The dimensions of the burette tip fluctuate typically in the range of millimeters. The cover part may comprise an outer diameter of about 3 mm to 5 mm. The burette body comprises an outer diameter of approx 5 mm and a height of about 2 mm. The membrane is formed square and typically has a lateral length of 2 mm to 3 mm.

The thickness of the membrane and the material of the membrane are essential for achieving a certain pretensioning. Typically the membrane has a thickness of a few tenths of a millimeter.

In FIG. 5 an alternative embodiment example of a covering 15 is shown. The burette body 10 in contrast to the embodiment example of FIG. 1 does not comprise a circumferential annular wall. The covering 15 is formed as a dome-like cover cap which is provided with openings 11 for the passage of a titrating agent. The covering 15 boxes in and covers simultaneously the membrane 2 and the seat 3. The cover 15 is placed onto the burette body 10 and latches on the outer side thereof.

With the design according to the invention of a burette tip the membrane and the seat are reliably protected from damage. Furthermore the design construction of the burette tip with the membrane clamped between two pieces is extremely simple.

What is claimed is:

1. A burette tip (1) for titrating a fluid, the burette tip consisting of a substantially tubular burette body (10), a membrane (2) for preventing reverse flow of fluid into the burette body, and a cover part (5), said burette body having means defining a seat (3), wherein the membrane is (2) is held between said seat (3) and the cover part (5), and wherein the cover part at least partly covers the membrane (2) and the seat (3) thereby protecting the membrane (2) and the seat (3) from mechanical damage.

2. A burette tip according to claim 1, characterised in that the body (10) comprises a circumferential annular wall (4), which encloses the membrane (2) and the seat (3).

3. A burette tip according to claim 1, characterised in that the cover part (5) in a central region (6) comprises a projection (7) for pressing the membrane (2) against the seat (3).

4. A burette tip according to claim 2, characterised in that the cover part (5) is latchable on the circumferential annular wall (4).

5. A burette tip according to claim 4, wherein the annular wall (4) comprises a recess (8) with a resting surface (9) for receiving the cover part (5), and the annular wall (4) encompasses the cover part (5), and the annular wall (4) projects beyond the cover part (5).

6. A burette tip according to claim 1, characterised in that the burette body (10) and the cover part (5) are each formed as one-piece plastic injection moulded parts.

7. A burette tip according to claim 1, characterised in that the cover part (5) is formed as a disk which is provided with webs (12) running through the centre (13).

8. A burette tip according to claim 1, characterised in that the membrane (2) is formed square.

9. The use of a pipette according to claim 1 for metering a titrating agent.

* * * * *